March 2, 1971 P. E. McCOY 3,567,460
SOIL DISPERSIBLE AND WATER DISPERSIBLE GRANULAR
PLANT AND ANIMAL NUTRIENT COMPOUNDS FOR USE
IN FERTILIZERS AND/OR IN ANIMAL FEEDS
AND METHOD OF MAKING SAME
Filed Aug. 26, 1968
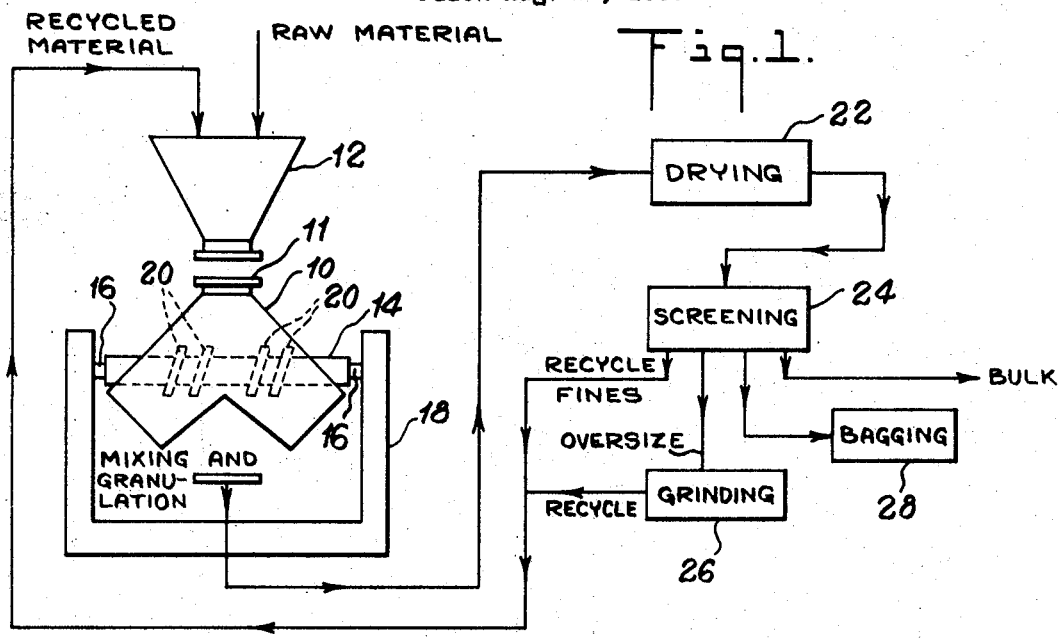
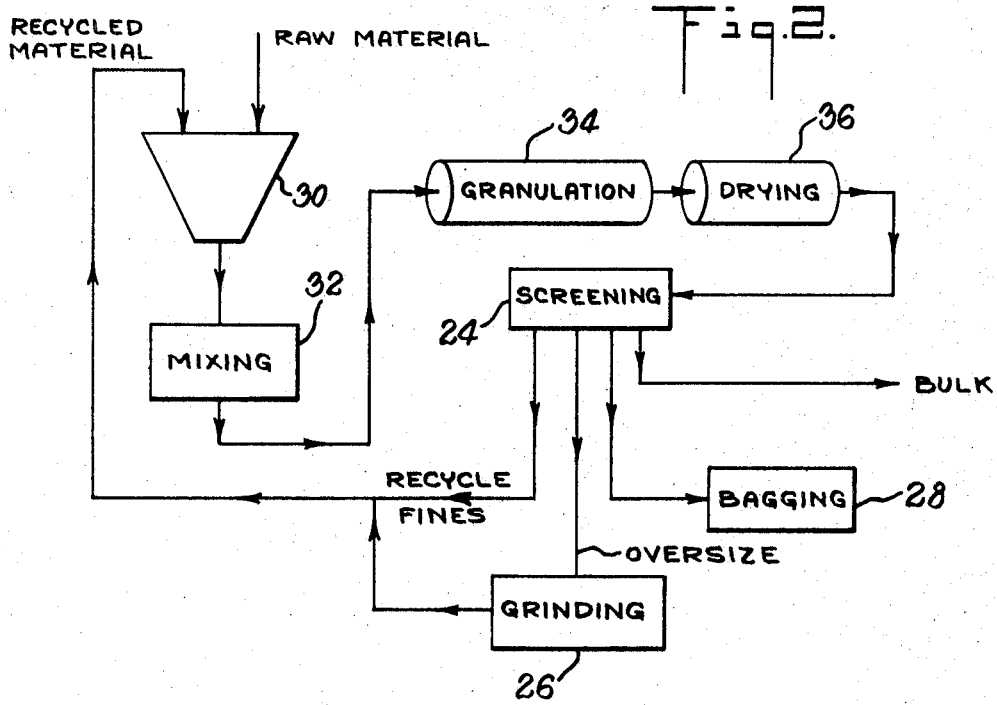
INVENTOR
PAUL E. McCOY
BY
*Samuelson & Jacob*
ATTORNEYS United States Patent Office 3,567,460
Patented Mar. 2, 1971

3,567,460
SOIL DISPERSIBLE AND WATER DISPERSIBLE GRANULAR PLANT AND ANIMAL NUTRIENT COMPOUNDS FOR USE IN FERTILIZERS AND/OR IN ANIMAL FEEDS AND METHOD OF MAKING SAME
Paul E. McCoy, 69 McDougall Lane, Bogota, N.J. 07603
Filed Aug. 26, 1968, Ser. No. 755,207
Int. Cl. A23k 1/00; C05f 5/00
U.S. Cl. 99—2
28 Claims

ABSTRACT OF THE DISCLOSURE

Soil dispersible and water dispersible, granular, plant and animal nutrient compounds for use in fertilizers and/or in animal feeds wherein a plurality of fines of the micronutrients are entrapped together with a gas in an outer coating of water soluble material such as a polysaccharide; the granular, nutrient compounds being produced by mixing fines of the nutrients with a nonsolid, water soluble material for appropriate times at appropriate temperatures.

---

The invention relates to soil dispersible, water dispersible, granular, micronutrient compounds and to a method for making such granular micronutrient compounds.

Numerous tests and many years of experience of the agriculture industry of the United States have demonstrated the need for micronutrients for plant and animal growth. This invention is directed toward providing granular, micronutrient compounds wherein the actual delivery of the micronutrient to the plant and/or animal is maximized while the loss due to shrinkage during production, packaging and shipping is minimized.

For the purpose of facilitating the description of the invention, certain terms used herein are defined as follows:

"Water dispersible"—the granule or agglomerate falls apart, bursts apart and/or separates into fines when the granule is placed in contact with water.

"Soil dispersible"—the granule or agglomerate falls apart, bursts apart and/or separates into fines when the granule is placed in contact with the moisture in the soil.

"Nutrient compound"—includes major nutrients, secondary nutrients, micronutrient, minor elements and trace minerals.

"Major nutrients"—materials without which a plant cannot sustain growth and with which, alone, a plant can sustain life. These are nitrogen, phosphorus and potash.

"Secondary nutrients"—materials which are required by a plant in substantial quantities but not as great as major nutrients to improve plant growth. These are calcium, magnesium and sulfur.

"Micronutrients," "minor elements," "trace elements"—materials which are required by plants and/or animals in lesser amounts than the major and secondary nutrients and which will further improve plant and/or animal growth and health. These materials are compounds of an element of nutrient value combined with oxygen, sulfur, carbon, hydrogen, nitrogen and other salts. Some of these elements of nutrient value are:

manganese (Mn)
zinc (Zn)
copper (Cu)
iron (Fe)
chlorine (Cl)
boron (B)
iodine (I)
cobalt (Co)
molybdenum (Mo)
magnesium (Mg)
rare earth ("RE")
(lanthanoide series)
lithium (Li)
yttrium (Y)
thorium (TH)

"Fines"—particles ranging in size from 85% through 60 mesh United States standard sieve down to particles of one micron and smaller.

Oxides of the aforementioned metals have been shown to be "available" and useful to plant life if in finely divided form in the soil. Furthermore, any material put into the soil must have a high enough "population" per square foot of soil to "get to the plant" or for the plane to come close to it. Sulfates are water-soluble and accomplish this by solution, which solution is eventually spread and carried by soil moisture throughout the area.

Oxides are water-insoluble, and unless finely divided will not move from the point of deposit.

On the other hand, in order to properly make a homogeneous, final, complete, fertilizer containing micronutrients, the micronutrients or "minor elements" must be put through a "wet-process" or "ammoniation process" with all the other fertilizer ingredients to obtain a final homogeneous granule (containing all materials including the micronutrient) or the micronutrients (minor elements) must be dry-mixed with the major nutrients, with all the granules of at least −8 +20 mesh size. Therefore, in order to avoid segregation, the micronutrients must also be of this same mesh size.

However, when the micronutrient granules are put into the soil, they must break down into fines again to be useful to plant life.

Broadly, the invention is directed toward providing granular, plant and animal nutrient compounds which may be dry mixed with the basic fertilizer and shipped to the consumer in a single container such as a 100 pound bag. If the plant and animal nutrient compound is not of the same general size as the fertilizer granule, the micronutrient granules will separate out and there will not be an even distribution of fertilizer and micronutrient compound when the contents are broadcast. However, since greatest value of a micronutrient is obtained when the micronutrient reaches the plant as fines, the granule must disperse rapidly into fines upon making contact with the moisture in the soil.

Nutrient compounds of the invention are formed by agglomerating or otherwise binding the fines into a granule whose outer coating is a water soluble material. By utilizing the teachings of the invention and maintaining the time and temperature during processing between appropriate limits, a certain amount of gas such as carbon dioxide is entrapped in the granule. When the outer coating dissolves in the presence of moisture, the expanding volume of the gas explodes the granule andd aids in dispersing the fines throughout the volumes surrounding the original granule.

The method of producing granular, nutrient compounds of the invention comprises mixing the nutrient with water and a binder such as a polysaccharide. The granules are dried and then sized prior to packaging.

The method of the invention also may be employed to produce a fine granular, micronutrient compound, for example, of a size between —20 and +60 mesh, U.S. standard sieve. This size compound may be used to provide a non-dusting, non-bulking reduced-loss type raw material for use in the wet-process manufacture of complete granular fertilizers. Material of such size is fine enough to enter into the chemical process reactions and coarse enough to minimize the losses due to dusting. Bulking problems which interfere with chemical reactions are also eliminated. During the wet-process manufacture of granular fertilizers, the water soluble, outer coating dissolves and the fines are distributed into the mixture.

It is an important object of the invention to provide a granular nutrient compound which will disperse into finely divided particles (fines) when the granular compound makes contact with water and/or soil moisture.

It is a further object of the invention to provide such granular materials which combine nutrients which are water soluble and release plant availability quickly into the soil and nutrients which are substantially water insoluble and release plant availability slowly into the soil.

It is a still further object of the invention to provide such materials which are more resistant to erosion and leaching from the soil. Some examples of such materials are the oxsulfates and oxysulfates of manganese, zinc and copper.

It is a still further object of the invention to provide such materials wherein the micronutrients are water soluble and are released into the soil very rapidly.

It is a still further object of the invention to provide such material which can be handled in bulk without the problems of loss and atmospheric pollution usually encountered when fines are used in the wet process, ammoniation, fertilizer manufacturing process or in the dry mixing or blending of fertilizers.

It is a still further object of the invention to provide a method for producing such materials.

These and other objects, advantages, features and uses will be apparent during the course of the following description, when taken in conjunction with the accompanying drawings, wherein:

FIG. 1 is a flow diagram of a preferred embodiment of the method of the invention showing the Patterson-Kelley liquid-solids blender in the loading position; and FIG. 2 is a diagram similar to that of FIG. 1 showing a hopper, a mixer, a rotary granulator and a rotary dryer.

In the drawings, wherein, for the purpose of illustration, are shown embodiments of the method of the invention, the numeral 10 designated a Patterson-Kelley Liquid-Solids Blender diagrammatically. The raw material (micronutrient fines) is inserted in blender 10 through the hopper 12 in the position shown in FIG. 1.

The liquid containing a water soluble polysaccharide and/or monosaccharide binder, such as the aldehyde forms of sugars, d-glucose (aldehyde form), d-mannose, d-fructose, osone, maltose, molasses, molasses extract, cane sugar extract, beet sugar extract, lactose, starch and pectin, or cellulosic derivatives or compounds such as those manufactured by Dow Chemical Company under the trademark Methocel, is introduced into blender 10 through intensifier 14 (details not shown).

The blender 10 is sealed at 11 and the blender 10 is rotated around bearings 16 which are mounted in frame 18. As the blender rotates the fins or blades 20, which are mounted on intensifier bar 14, mix the micronutrient fines and the liquid. The type of nutrient used and the size of the granules desired determine the processing time in blender 10.

By way of illustration but without limitation of the scope of the invention, following are some examples of the process parameters of the invention.

In a Patterson-Kelley liquid-solids blender having a 47.5 cubic foot capacity, the liquid is fed into the blender for about 10 minutes, the liquid feed is cut off and the contents are mixed by the fins 20 from 3 to 8 minutes and then the container and its contents are tumbled for an additional 3 to 8 minutes. The lengths of the mixing time and of the tumbling time determine the size, hardness and, to some extent, the dispersibility of the finished granules. Broadly, longer times will produce coarser granules. If the times are too long, there will be no carbon dioxide entrapped and the fines will not be dispersed when the granules are placed in the soil.

By way of further example, I have found that I can produce granular micronutrient compounds as follows:

| Size | Principal micronutrient | Pounds of molasses, sugar or methocel, per ton of end product |
|---|---|---|
| Fine (—20 +60 mesh) | MnO | 100 |
| Coarse (—8 +20 mesh) | MnO | 200 |
| Fine (—20 +60 mesh) } Coarse (—8 +20 mesh) } | ZnO | 400 |
| Fine (—20 +60 mesh) | MgO | 200 |
| Coarse (—8 +20 mesh) | MgO | 300 |
| Fine (—20 +60 mesh) } Coarse (—8 +20 mesh) } | Mixture of MnO, MgO, ZnO in equal amounts. | 200 |

The output of blender 10, in granular form, is fed to a dryer. (Drying step 22 is carried out in the dryer.) Any dryer well known in the art such as a belt dryer, a tumble dryer or a rotary dryer, may be used. The temperature range in the dryer depends upon the type of dryer and the desired drying time.

I have found that the moisture content of the material being fed to the dryer is perferably between 5% and 20% depending upon the desired size of the final granules and their desired porosity. Excellent results have been obtained with granules which have a dryer input moisture content of 10% to 12% and a dryer output moisture content of 1% to 5%.

Drying temperatures in the range of about 180° to 350° F. have been found to be satisfactory. The higher temperatures have been found preferable.

From drying step 22, the material is fed to screening step 24. At this step, the granules are sized in U.S. Standard Sieve meshes. If coarse granules (—8 +20) are to be shipped, all granules larger than 8 mesh are fed to grinding step 26 where any standard grinder is used to pulverize the oversize granules. All granules smaller than mesh 20 (considered to be fines for this purpose) are also screened out. Both the fines and the pulverized coarse granules are recycled back to hopper 12 and reprocessed by the method of the invention.

The proper size granules are either accumulated in bulk or fed to bagging step 28 where the finished product is packed, as required.

In FIG. 2, there is illustrated a flow diagram for an alternative embodiment of the method of the invention. The micronutrient raw material is fed through hopper 30 to mixing step 32 where the water soluble binder and water are added to the micronutrient raw material. From the mixing step 32 the mixed material is fed to the granulation step 34. This step can be carried out in a rotary granulator which is well known in the art. The rotational velocity of the granulator and the rotational time control the granule size.

After the material leaves the granulation step, it reaches drying step 36. This step may be the same as step 22 or it may be combined with granulation step 34 in a single rotary unit. The process after leaving the drying step 36 is the same as that previously described for material leaving drying step 22.

The chemistry of the invention may be readily understood from the following discussion. The aforementioned binders are actually monosaccharides, disaccharides and polysaccharides which, with water and heat, break down, in time, to form monosaccharides. In so doing, the polysaccharides go through the disaccharide stage. The aldehyde type of disaccharides are reducing agents as are all monosaccharides. Polysaccharides are amorphous substances (essentially chemical compositions of monosaccharide and disaccharide molecules) of varying solubilities.

When the raw material is mixed with the mixture of saccharides, only original agglomerations are formed. However, when the agglomerates of the proper porosity, hardness and size are subjected to the drying operation, the contained mixture of saccharides is introduced to heat. The heat not only drives off the moisture but also aids in the conversion of the polysaccharides to disaccharides and the disaccharides to monosaccharides. Concurrently, since monosaccharides are reducing agents and since the aldehyde disaccharides are reducing agents, the higher valence state elements are reduced to their lower valence states. If these elements are present in their oxide form, oxygen is released in the reaction. The reducing saccharides become oxidized in turn and since oxidized saccharides or oxidized carbohydrates are unstable, they break down to release carbon dioxide and water.

Simultaneously, the crystalline portion of the saccharides, present during the drying process, form a hard outer crust, which is somewhat porous, due to the mixture of polysaccharides in the binder. Hence, the released gas is entrapped in the now hardened granule. Thus, in addition to the element's being reduced to its lower valence state and thereby adding to the plant nutrient availability, gas is entrapped in the granule to be released when the crystallized saccharides dissolve in water. This release of gas bursts the granule apart and disperses the micronutrient into fines through the soil.

In addition to the above described chemical reactions produced by the drying process, the mixture of monosaccharides, disaccharides and polysaccharides tend to ferment in time or to ferment rapidly in the presence of heat to produce additional carbon dioxide. An example of the above reactions is as follows:

Any $MnO_2$ + Reducing carbohydrate or reducing disaccharide or monosaccharide $\xrightarrow{\Delta \text{ Heat}}$ present $MnO + H_2O$ + Oxidized carbohydrate Oxidized carbohydrate $\longrightarrow CO_2 + H_2O$ Thus, it can be seen that using this type of carbohydrate not only furnishes the carbon dioxide to burst the granule apart but also reduces the metallic oxides to the lower valence state which is best for plant utilization.

It is often advisable to use metallic oxsulfate or metallic oxysulfate micronutrients since the sulfate is water soluble and dissolves quickly and the oxide releases more slowly and is non-leaching. An end product oxsulfate or oxysulfate which is ⅓ oxide and ⅔ sulfate, ½ oxide and ½ sulfate, or any other proportion of oxide and sulfate may be produced as a stoichiometric mixture of the following on a pure basis, with suitable adjustment for concentration and premixing:

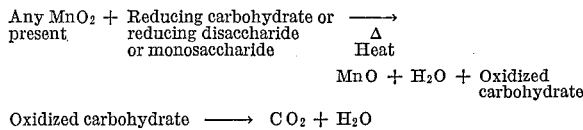

In the above compounds, each granule is a mixture of oxide and sulfate in which the chemical linkage or bond is direct between the metallic atom and the sulfur or oxygen atom. In this case, the compound is called an oxsulfate.

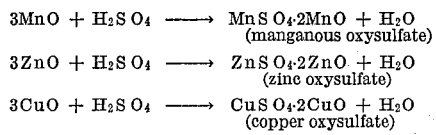

In the above compounds, the chemical linkage or bond is from the metallic atom to the oxygen atom to the sulfur atom and in this case the compound is an oxysulfate.

The above reactions are exothermic and can be carried out in the Patterson-Kelley liquid-solids blender so that granular micronutrient compounds of the invention can be obtained dry in essentially one step. This has a distinct advantage over any of the prior art wet processes.

While particular embodiments of the invention have been shown and described, it is apparent to those skilled in the art that modifications are possible without departing from the spirit of the invention.

The embodiments of the invention in which an exclusive property or privilege is claimed are defined as follows:

1. A soil dispersible and water dispersible granular nutrient compound for use in fertilizers and/or in animal feeds comprising:
   a plurality of fine micronutrient particles from at least one of the class made up of metallic oxides, metallic sulfates, metallic oxysulfates and metallic oxsulfates;
   a water soluble, crystallized saccharide, outer coating binding the plurality of fine particles into a unitary granular compound; and
   gas such as carbon dioxide entrapped in the unitary granular compound such that when the water soluble outer coating is dissolved, the release of the carbon dioxide causes the plurality of fine particles to disperse to thereby improve their beneficial effect in the soil and/or the animal feed.

2. The invention of claim 1 wherein at least a portion of the granular nutrient compound is of a size between —8 and +20 mesh.

3. The invention of claim 2 wherein at least a portion of the granular nutrient compound is of a size between —20 and +60 mesh.

4. The invention of claim 1 wherein at least a portion of the granular nutrient compound is of a size between —20 and +60 mesh.

5. The method of producing a soil dispersible, water dispersible, granular nutrient compound for use in fertilizers and/or animal feed which comprises:
   placing fine micronutrient particles from at least one of the class made up of metallic oxides, metallic sulfates, metallic oxysulfates and metallic oxsulfates in a container;
   mixing the fine micronutrient particles in the container with a nonsolid saccharide;
   granulating the mixture to initiate a chemical reaction forming a gas such as carbon dioxide and to agglomerate the fine micronutrient particles and the nonsolid saccharide to form granules thereof; and
   drying the granules by heating, to continue the chemical reaction forming a gas such as carbon dioxide inside the granules and continuing after the outer surface of the granule has been crystallized so that gas from the saccharide is entrapped in said granular nutrient compound which has a water soluble, crystallized saccharide, outer coating.

6. The invention of claim 5 including the step of selecting granules of a predetermined size.

7. The invention of claim 5 wherein the temperature during the drying is in the range of about 180° F. to 350° F.

8. The invention of claim 6 wherein the mixing and granulating steps comprise:

feeding liquid into the container for approximately 10 minutes while mixing the contents of the container;

mixing the contents of the container for about 3 to 8 minutes; and tumbling the mixed contents of the container for about 3 to 8 minutes.

9. The invention of claim 6 wherein at least a portion of the granules selected are of a size between —8 and +20 mesh.

10. The invention of claim 6 wherein the temperature during drying is in the range of about 180° F. to 350° F.

11. The invention of claim 7 wherein the mixing and granulating steps comprise:

feeding liquid into the container for approximately 10 minutes while mixing the contents of the container;

mixing the contents of the container for about 3 to 8 minutes; and tumbling the mixed contents of the container for about 3 to 8 minutes.

12. The invention of claim 8 wherein at least a portion of the granules selected are of a size between —8 and +20 mesh.

13. The invention of claim 9 wherein at least a portion of the granules selected are of a size between —20 and +60 mesh.

14. The invention of claim 10 wherein the mixing and granulating steps comprise:

feeding liquid into the container for approximately 10 minutes while mixing the contents of the container;

mixing the contents of the container for about 3 to 8 minutes; and tumbling the mixed contents of the container for about 3 to 8 minutes.

15. The invention of claim 5 wherein the mixing and granulating steps comprise:

feeding the liquid into the container for approximately 10 minutes while mixing the contents of the container;

mixing the contents of the container for about 3 to 8 minutes; and tumbling the mixed contents of the container for about 3 to 8 minutes.

16. The invention of claim 14 wherein at least a portion of the granules selected are of a size between —8 and +20 mesh.

17. The invention of claim 11 wherein at least a portion of the granules selected are of a size between —8 and +20 mesh.

18. The invention of claim 7 wherein at least a portion of the granules selected are of a size between —8 and +20 mesh.

19. The invention of claim 10 wherein at least a portion of the granules selected are of a size between —8 and +20 mesh.

20. The invention of claim 19 wherein at least a portion of the granules selected are of a size between —20 and +60 mesh.

21. The invention of claim 17 wherein at least a portion of the granules selected are of a size between —20 and +60 mesh.

22. The invention of claim 16 wherein at least a portion of the granules selected are of a size between —20 and +60 mesh.

23. The invention of claim 12 wherein at least a portion of the granules selected are of a size between —20 and +60 mesh.

24. The invention of claim 8 wherein at least a portion of the granules selected are of a size between —20 and +60 mesh.

25. The invention of claim 14 wherein at least a portion of the granules selected are of a size between —20 and +60 mesh.

26. The invention of claim 11 wherein at least a portion of the granules selected are of a size between —20 and +60 mesh.

27. The invention of claim 10 wherein at least a portion of the granules selected are of a size between —20 and +60 mesh.

28. The invention of claim 6 wherein at least a portion of the granules selected are of a size between —20 and +60 mesh.

References Cited

UNITED STATES PATENTS

| | | | |
|---|---|---|---|
| 3,194,682 | 5/1965 | Tippens et al. | 99—2 |
| 3,353,949 | 11/1967 | Nay | 71—64 |
| 3,423,199 | 1/1969 | Philen, Jr. et al. | 71—64 |

REUBEN FRIEDMAN, Primary Examiner

C. N. HART, Assistant Examiner

U.S. Cl. X.R.

71—11, 64, 1; 99—141; 106—308; 260—209